Sept. 21, 1954  G. W. WACKER  2,689,376
METHOD AND APPARATUS FOR INJECTION MOLDING
Filed July 13, 1948

INVENTOR.
GEORGE W. WACKER.
BY
Wood, Arey, Herron & Evans
ATTORNEYS.

Patented Sept. 21, 1954

2,689,376

UNITED STATES PATENT OFFICE 2,689,376

METHOD AND APPARATUS FOR INJECTION MOLDING

George W. Wacker, Cincinnati, Ohio

Application July 13, 1948, Serial No. 38,542

5 Claims. (Cl. 18—30)

1

This invention relates to a method and apparatus for converting granular thermoplastic molding material into a heated cylindrical mass which is enclosed within an integral, congealed skin, the interior of the mass being in flowable condition. This mass or package, is adapted to be inserted in the injection chamber of an injection molding machine to be injected under high pressure into the cavity of a mold.

The present method and apparatus is intended primarily for molding relatively large complex articles such as battery cases involving considerable quantities of material and requiring that the machine be charged individually for each operation, as distinguished from machines designed for relatively small articles which may be molded rapidly.

As applied to the injection molding of thermoplastic articles, the flowable material is injected into a sectional mold in a flowable state by means of a ram which reciprocates in an injection chamber. It is retained in the mold for a predetermined setting or curing period and after setting the mold is separated and the molded article removed. To provide proper density and to fill completely all of the crevices and configurations of the mold, the material is maintained under high pressure during the setting period with the mold sections firmly clamped together to withstand the pressure. In the case of thermoplastic material, a cooling medium may be circulated through the mold to speed up the setting of the material.

According to the present invention, the cartridge or preformed charge consists of a mass of heated thermoplastic material in a flowable state confined in a chilled, congealed skin formed of non-tacky plastic material, the skin comprising a generally cylindrical side wall and a pair of flat end walls. The walls completely enclose heated thermoplastic material and the cartridge is adapted to be inserted directly into the injection chamber of the molding machine for injection into the mold upon movement of the injection plunger.

A primary object of the invention has been to provide a method and apparatus for extruding heated, flowable plastic material into a container between the end wall of the container and a relatively movable, chilled follow plate, and progressively chilling the flowable material as it flows across the follow plate to form the congealed skin as the cartridlge progressively is extruded.

A further object has been to provide an improved charging means by which the cartridge or charge is prevented from seeping between the injection plunger and charging chamber under the high pressures developed during the injection operation, thereby eliminating the danger of damage to the injection mechanism.

In practicing the invention, thermoplastic material is expressed through a nozzle which includes suitable heating means and which has the follow plate, preferably cylindrical, at its outer end. The bore of the container preferably is cylindrical and the follow plate slidably interfits the bore, the container and nozzle being mounted for relative axial motion. The nozzle includes a bore extending outwardly through the follow plate and means are provided for chilling the follow plate.

At the start of the operation, the follow plate resides near the end wall of the container, and the heated material is expressed into the space between the follow plate and end wall to form a pair of displaceable, congealed end walls residing respectively against the follow plate and container wall. The operation of expressing the thermoplastic material causes relative displacement of the follow plate and container in response to the extrusion pressure. At the same time, the heated material flows from the bore and radially outwardly across the chilled surface of the follow plate and thus progressively forms the congealed cylindrical side wall. This operation is continued until the full length of the cylindrical cartridge is extruded, thereby to form the hardened skin which completely envelopes a mass of heated flowable material. Since the follow plate is chilled continuously during the operation, the end wall which is formed at the follow plate has a greater thickness than the opposite end wall. After forming the cartridge is placed in the injection chamber of a press, preferably by placing the container in inverted position, that is with its open end facing downwardly upon the open end of the injection chamber. This disposes the thicker end wall in contact with the end of the injection plunger to prevent leakage of the plastic material into the space between the surface of the plunger and chamber during injection.

The extrusion nozzle is heated preferably by a jacket or passageway surrounding the bore through which a heating medium may be circulated. The follow plate at the outer end of the nozzle preferably includes a jacket or pasageway through which a cooling medium is circulated so as to form the hardened skin as the material flows from the bore of the nozzle and radially outwardly across the follow plate toward the walls of the container.

By virtue of the congealed skin, the cartridge does not adhere to the container but instead slides readily from it into the injection chamber. However, in order to assist the discharge, a hole may be drilled through the end wall of the chamber and air pressure may be applied by placing the end of an air nozzle against the hole to force the charge from the container into the injection chamber.

Various other objects and advantages of the invention will be more fully apparent to those skilled in the art from the following detailed description, taken in conjunction with the drawings.

Figure 1:
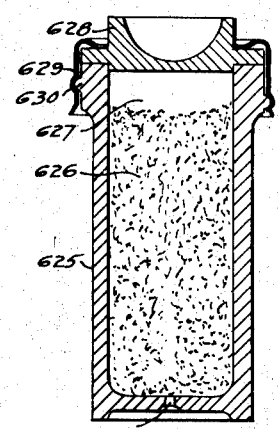
Figure 1 is a diagrammatic sectional view illustrating one method of forming the cartridge in a container, in which the granulated plastic material is reduced to a flowable state by heating the container and its contents.
Figure 2:
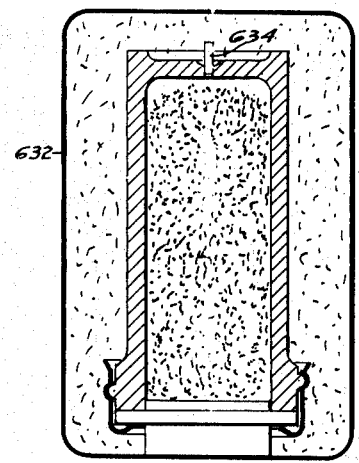
Figure 2 is a diagrammatic view showing the container placed in a heating chamber to reduce the material to a flowable state.
Figure 3:
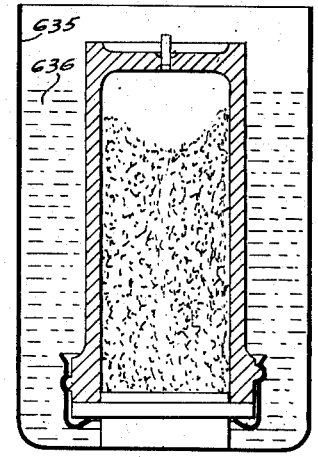
Figure 3 is a view similar to Figure 2, showing the container transferred to a chilling chamber to form a congealed skin upon the cartridge.
Figure 4:
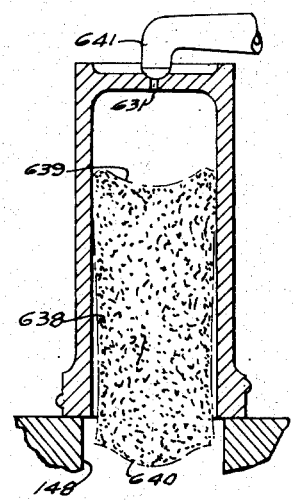
Figure 4 is a diagrammatic view showing the cartridge being injected into the injection chamber of a press, utilizing air pressure to expel the cartridge from its container.
Figure 5:
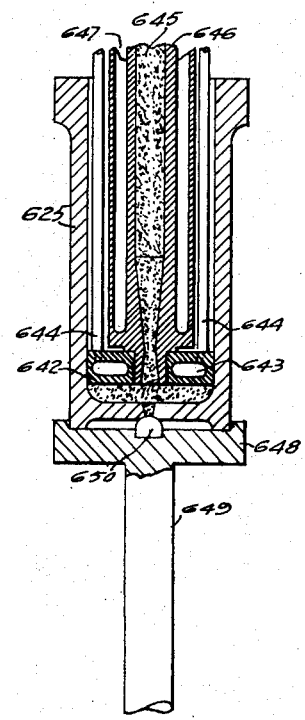
Figure 5 is a diagrammatic view illustrating the preferred form of the invention, showing the extrusion nozzle and follow plate in the container at the start of an extrusion operation.
Figure 6:
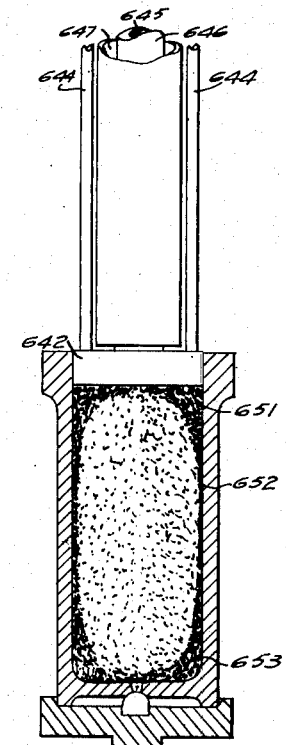
Figure 6 is a view similar to Figure 5 showing the relationship of the chamber and nozzle at completion of the extrusion operation, with the cartridge confined in the chamber ready to be transferred to the injection chamber of a press.

Referring to the drawings, Figures 1 to 3 illustrate a refillable container 625 in which the plastic cartridge or preformed charge is produced by heating and chilling the container, while in Figures 4 to 6 inclusive, the cartridges are produced by the extrusion method. In both instances, the cartridge is transferred directly from the container to the injection chamber of the molding machine by placing the container in inverted position over the open end of the chamber as illustrated in Figure 4. In executing the operations disclosed in Figures 1 to 3, the container is filled manually with granulated thermoplastic material indicated at 626 leaving an air space 627 indicated in Figure 1. After the heating and chilling operations described later, a cartridge is produced having a congealed skin enclosing the flowable mass. However, this method does not form thickened end walls on the cartridge because all the surfaces are heated and chilled for substantially the same period of time.

Described in detail with reference to Figures 1 to 3, container 625 includes a closure member 628 which may be secured by a screwthreaded band 629 engaged on thread 630. The interior of the container preferably tapers slightly from the bottom to the mouth to facilitate discharge of the material into the injection or charging chamber. This container may be made of any suitable metal, or if desired, it may be made of heat-proof glass. After closure 628 is applied, the container is inserted in an oven or heating chamber 632 (Figure 2), and is left in the oven for a sufficient period of time for the material to become flowable. The container is then transferred to a cooling chamber 635 (Figure 3). The purpose of cooling the container is to chill it slightly and form a non-adhesive skin to facilitate discharging the mass of material into the charging chamber. After a proper cooling period, this skin, which is in direct contact with the container, loses its tackiness so that the charge slides readily from the container into the charging chamber.

To assist in discharging the plastic from the container 625, a hole 631 may be drilled through its bottom and a nozzle 641 applied to this hole to force the charge out by air pressure (Figure 4). Under air pressure, the upper part of the charge will be deformed as at 639 and the body of the charge will contract slightly as indicated at 638, while a bulge 640 forms at its lower end. This is due to the semifluid condition of the material and the fact that it is enclosed in a plastic skin. During heating and chilling, the air hole 631 preferably is closed by a plug 634 (Figures 2 and 3). The chilling operation prevents any of the plastic material from adhering to the container 625 and after discharge of the material the container is clean and free of contamination in condition to be refilled.

In molding work of a single type or color, the use of an extruder for loading the container 625 is shown, as illustrated in Figures 5 and 6. In this instance, a batch of plastic, of a given color or type, is placed in the extruding apparatus (not shown) having suitable heating equipment. The nozzle 646 of the extruder is introduced into container as shown in Figure 5. A cooled follower plate 642 excludes air from the charge, the follower plate having passage 643 through which is circulated a cooling medium supplied by the tubes 644—644. The flowable molding material is forced from the extruder through the passageway 645 which terminates in a restricted aperture cooled by the follower plate 642 at the discharge end of the nozzle.

The nozzle is surrounded by a shell providing an annular passageway 647 through which a heating medium may be circulated. During the charging operation, the container 625 is supported against a tail stock 648 mounted on shaft 649 having a spur 650 which seals off the aperture in the bottom of the container.

The flowable material is forced into the container, and by virtue of the cooling effect of the follower plate 642, the charge will comprise a fluid interior and a congealed skin or shell, roughly approximating the densely stippled portion 652 of the charge (Figure 6). The shell 652 has relatively heavy end portions 651 and 653 due to the action of the cooling follower plate 642. The extrusion nozzle preferably is fixed and the shaft 649 of tail stock 648 is slidably mounted so that the container 625 is forced rearwardly during the filling operation as shown in Figures 5 and 6. Immediately after filling, the container is emptied into the charging chamber of the press to prevent the charge from becoming re-heated and tacky.

In the use of the refillable container 625, heated molds preferably are employed since the molding material must be sufficiently flowable to fill the mold completely. The hardened skin disappears during injection, since it picks up heat from the heated mold surfaces and thus is reduced to a fluid state.

The use of a chilled or case hardened charge preferably is carried out with the charging chamber at room temperature so that the chilled lower end of the charge which is in contact with the injector plunger, is maintained in its hardened skin to prevent leakage of material into the space between the plunger and bore of the charging chamber during injection.

In conventional injection molding machines with built-in heating mechanisms, the injection plunger forces flowable molding material from a heating chamber into the cavity of a separable, closed mold, under pressure ranging from 15 to 30 thousand pounds per square inch. This requires a so-called "heel" of unplasticized and substantially non-flowable material at the nose of the plunger. If, by improper operation of the machine, this heel disappears and is replaced by hot and flowable material, the result usually is a galled or stuck plunger, causing a shutdown and costly repairs.

In the practice of my invention, the method of forming cartridges is useful primarily for the production of large plastic articles which require injection chambers of relatively large capacity, and employing plungers of 4 inches diameter and over. Experience has taught that these large plungers cannot be fitted into their chambers with the accuracy possible in the conventional machines using plungers of smaller diameter. Thus, by requiring substantially greater running clearances, the advantage of lower injection pressure ordinarily would be lost.

In the use of the case hardened charge, which is temporarily shape sustaining due to the integral congealed skin, I utilize the molding material itself, in the form of the chilled non-flowable end wall 651 to form a seal at the nose of the injection plunger. Both end wall portions 651 and 653, as shown in Figure 6, comprise material in multiple zones of progressively varying viscosity ranging from rigid on the surface to soft and flowable away from the surface.

In its use, the initial pressure of the plunger expands the congealed skin into tight contact with the cool chamber wall and plunger nose, with non-flowable material at the clearance space of the plunger. The end wall 651 residing at the plunger nose will not regain its plasticity and is not injected into the cavity, but forms part of the necessary residue or cull as required in transfer molding. However, the relatively thin cylindrical skin which sustained the charge prior to being placed in the chamber, merges with heated material during the distortion of the charge in the process of being forced into the mold cavity and again becomes sufficiently flowable to be forced into the mold cavity.

Figure 6, already referred to, shows how the chilled sealing element 651, shown in exaggerated form, also functions to prevent the undesirable leakage of material between the follower plate 642 and the container 625 during the filling of the latter. Figure 6 also shows how the somewhat similar, distortable end wall 653 is formed at the closed end of the container.

From the foregoing it will be seen that the sealing end wall incorporated in the preformed charge, forms a vital link in the molding process, involving the trouble free operation of a transfer molding press using charges made in a separate but somewhat similar molding apparatus and requiring two separate molding operations.

Having described my invention, I claim:

1. The method of preparing preformed charges of thermo-plastic material enveloped in a congealed skin for charging the injection chamber of a molding machine comprising the steps of expressing heated holding material in a flowable state through a nozzle into a container having an open end, chilling the surface of the flowable material progressively as the same is charged into the container to envelop the flowable material within a congealed skin, and discharging the preformed charge into the injection chamber by applying compressed air to the closed end of the container with the open end thereof presented to the injection chamber.

2. An apparatus for preparing individual preformed charges of plasticized thermo-plastic molding material adapted to maintain dimensional stability and having relatively thick flat end walls adapted to seal the clearance space in the injection chamber of a molding press, said apparatus comprising a container having a cylindrical bore adapted to receive and contain the preformed charge, an elongated nozzle having a passageway therethrough including a delivery end adapted to discharge thermo-plastic material, a heating jacket surrounding said nozzle, means for circulating a heating fluid through said jacket to maintain the thermo-plastic material in a heated flowable state during passage through the nozzle, a cylindrical follower plate mounted upon the delivery end of said nozzle, said follower plate slidably interfitting the cylindrical bore of the container, said follower plate having a coolant passageway which extends annularly around the delivery end of said nozzle and outwardly toward the periphery of the follower plate to provide a chilling surface extending substantially for the full area of the follower plate, means for circulating a cooling fluid through said coolant passageway, support means adapted to yieldably support said container adapting the container to move axially in response to the discharge of thermoplastic material into said container, said support means adapted to resist axial movement of the container and thereby produce a predetermined pressure within the container whereby said flowable material is forced into intimate contact with the internal surface of the container and follower plate to provide a congealed cylindrical skin having integral congealed end walls enclosing a mass of flowable thermo-plastic material, said walls adapting the charge to be transferred from the container to the injection chamber of a molding machine.

3. An apparatus for preparing individual preformed charges of plasticized thermo-plastic molding material adapted to maintain dimensional stability and having relatively thick flat end walls adapted to seal the clearance space in the injection chamber of a molding press, said apparatus comprising a container having a cylindrical bore adapted to receive and contain the preformed charge, an elongated nozzle having a passageway therethrough including a delivery end adapted to discharge thermo-plastic material, a heating jacket surrounding said nozzle, means for circulating a heating fluid through said jacket to maintain the thermo-plastic material in a heated flowable state during passage through the nozzle, a cylindrical follower plate mounted upon the delivery end of said nozzle, said follower plate slidably interfitting the cylindrical bore of the container, said follower plate having a coolant passageway which extends annularly around the end of said nozzle and outwardly toward the periphery of the follower plate to provide a chilling surface extending substantially for the full area of the follower plate, conduits extending axially along said elongated nozzle and externally thereof, said conduits having their ends in communication with said coolant passageway and adapted to circulate a cooling fluid through said coolant passageway, support means adapted to yieldably support said container adapting the container to move axially in response to the discharge of thermo-plastic material into said container, said support means adapted to resist axial movement of the container and thereby produce a predetermined pressure within the container whereby said flowable material is forced into intimate contact with the internal surface of the container and follower plate to provide a congealed cylindrical skin having integral congealed end walls enclosing a mass of flowable thermo-plastic material, said walls adapting the charge to be transferred from the container to the injection chamber of a molding machine.

4. The method of preparing preformed charges of flowable thermo-plastic material enveloped in a congealed skin comprising the steps of expressing heated thermo-plastic molding material through a heated nozzle in a flowable state between a chilled follower plate and the end wall of a chilled container, whereby the flowable material is chilled at the beginning of the expressing operation to form a pair of displaceable congealed end walls at the end wall of the container and follower plate respectively, expressing thermo-plastic material between said congealed end walls and moving the container axially in response to the pressure developed by the expression of the thermo-plastic material between said congealed end walls, continuing to express and chill the external surface of the material between the congealed end walls by contact with the chilled walls of the container and thereby forming progressively a congealed cylindrical side wall integral with the end walls as the end walls are displaced relative to one another, and continuously chilling the follower plate during the expressing operation, thereby providing adjacent the follower plate an end wall which is thicker than the side wall and opposite end wall.

5. The method of preparing preformed charges of flowable thermo-plastic material enveloped in a congealed skin and of expressing the charges by operation of the ram of an injection chamber into a mold cavity, said method comprising the steps of expressing heated thermo-plastic material through a heated nozzle in a flowable state between a chilled follower plate and the end wall of a chilled container, whereby the flowable material is chilled at the beginning of the expressing operation to form a pair of displaceable congealed end walls at the end wall of the container and follower plate respectively, expressing thermo-plastic material between said congealed end walls and moving the container axially in response to the pressure developed by the expression of the flowable thermo-plastic material between said congealed end walls, continuing to express and chill the external surface of the material between the congealed end walls by contact with the chilled walls of the container and thereby forming progressively a congealed cylindrical side wall integral with the end walls as the end walls are displaced relative to one another, continuously chilling the follower plate during the expressing operation, thereby providing adjacent the follower plate an end wall which is thicker than the side wall and opposite end wall, removing the preformed charge from the container, and inserting the same into the injection chamber of a molding machine with said thicker end wall in contact with the ram to provide a sealing element between the ram and injection chamber.

References Cited in the file of this patent

UNITED STATES PATENTS

| Number | Name | Date |
|---|---|---|
| 1,993,942 | Novotny | Mar. 12, 1935 |
| 1,994,974 | Wiedmann | Mar. 19, 1935 |
| 1,999,834 | Ernst | Apr. 30, 1935 |
| 2,017,216 | Marcus | Oct. 15, 1935 |
| 2,232,104 | Ernst | Feb. 18, 1941 |
| 2,253,822 | Sundback | Aug. 26, 1941 |
| 2,274,279 | Shaw | Feb. 24, 1842 |
| 2,280,022 | Banigan et al. | Apr. 14, 1942 |
| 2,287,277 | Ryder | June 23, 1942 |
| 2,288,454 | Hobson | June 30, 1942 |
| 2,296,295 | Shaw | Sept. 22, 1942 |
| 2,327,079 | Wacker | Aug. 17, 1943 |
| 2,329,239 | Banigan | Sept. 14, 1943 |
| 2,339,607 | Smith | Jan. 18, 1944 |
| 2,355,613 | Wacker | Aug. 15, 1944 |
| 2,358,857 | Gits | Sept. 26, 1944 |
| 2,359,840 | Goessling | Oct. 10, 1944 |
| 2,360,000 | Lawyer | Oct. 10, 1944 |
| 2,373,593 | Pease | Apr. 10, 1945 |
| 2,420,405 | Alves | May 13, 1947 |
| 2,423,914 | Wacker | July 15, 1947 |
| 2,423,915 | Wacker | July 15, 1947 |
| 2,443,554 | De Mattia | June 15, 1948 |
| 2,465,889 | Lester et al. | Mar. 29, 1949 |
| 2,470,402 | Jobst | May 17, 1949 |
| 2,477,258 | MacMillin | July 26, 1949 |
| 2,491,890 | Butler | Dec. 20, 1949 |